June 15, 1937. W. LEATHERS 2,083,914
FILTER TOP FOR VACUUM CLEANERS
Filed Feb. 24, 1936
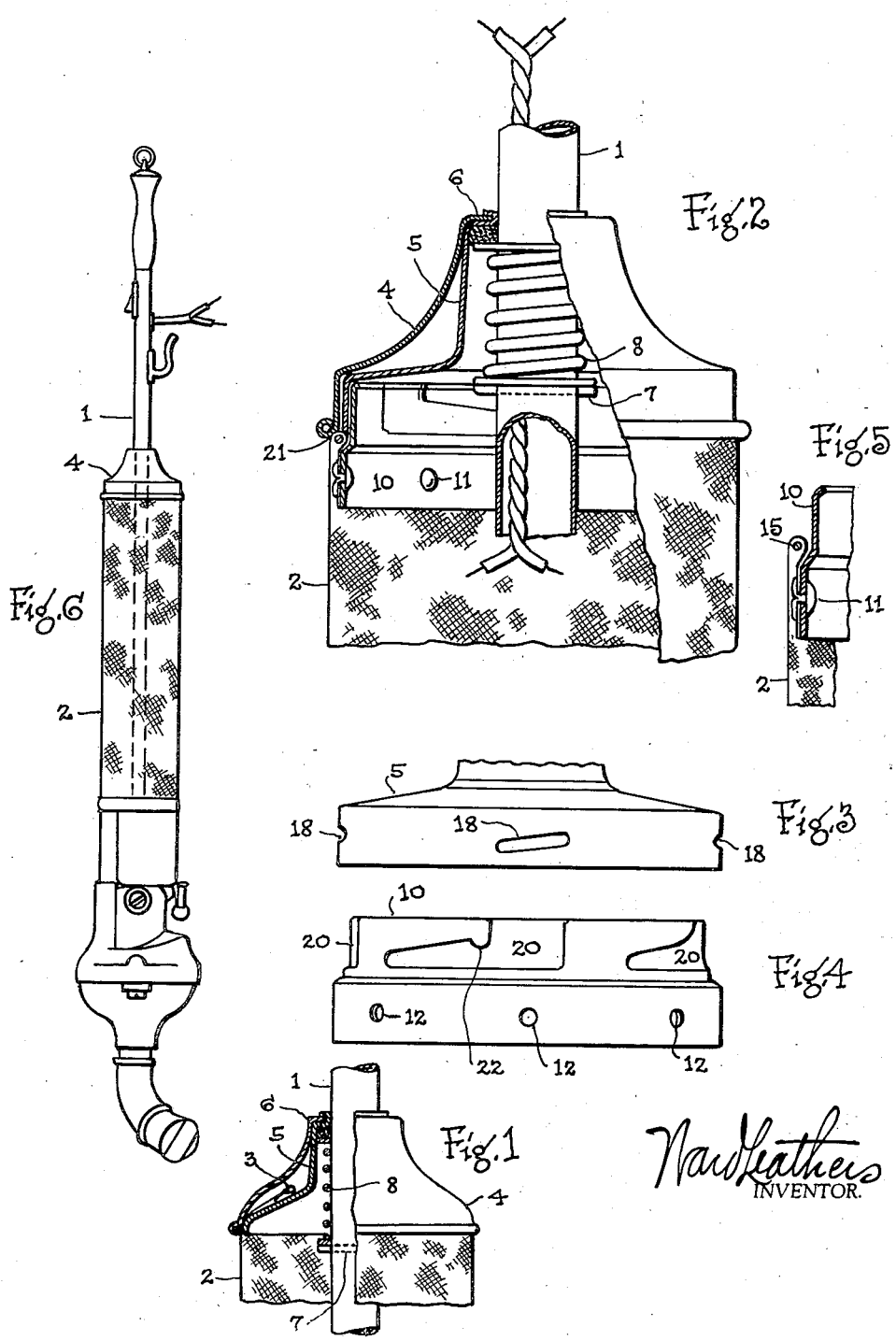

Patented June 15, 1937

2,083,914

UNITED STATES PATENT OFFICE 2,083,914

FILTER TOP FOR VACUUM CLEANERS

Ward Leathers, Haworth, N. J., assignor to Quadrex Corporation, New York, N. Y., a corporation of Delaware Application February 24, 1936, Serial No. 65,395

2 Claims. (Cl. 183—51)

The general object of my invention is to produce an improved type of filter for a vacuum cleaner. It applies more particularly to the kind of vacuum cleaner where the motor-suction-unit is rigid with the operating handle, the same being more fully set forth in my United States patents granted and numerous other applications pending therefor.

This specification is a continuation in part of my application for Letters Patent, Serial No. 713,347, filed February 28, 1934.

In one form of the vacuum cleaner described (and illustrated herewith) the filter is in the form of a sleeve which surrounds the handle. I have found that it is highly essential with such type of filter to make the top thereof, which also surrounds the handle, yieldable. It is highly desirable that it be permitted to move a limited longitudinal distance on the handle. It is also desirable on occasion to open the top of the filter, particularly in emergencies such as filter dirt stoppage. In order to open the top of the filter it is necessary that the joint be closable, preferably manually, air and dust tight, and further, in order that it may not come open accidentally in use and blow dirt into the face of the operator, it is desirable that when closed it be locked in that position. These are among the specific objects of the present invention.

In order to set forth my invention in terms understandable to those familiar with these arts, I have prepared this specification and appended drawing thereto of which:—

Figure 1 shows a partial cross-section of the upper portion of the filter mechanism surrounding an internal handle.

Figure 2 shows the same including an engaging but openable mechanism.

Figure 3 shows a partial side view of the internal cap.

Figure 4 shows a side view of the filter ring.

Figure 5 is a detail.

Figure 6 is a side view of a vacuum cleaner equipped with yieldable, openable filter cap.

A vacuum cleaner handle 1, Fig. 1, is surrounded by a sleeve of porous filter material 2. This material is drawn together by a draw string 3 and clamped between an outer filter cap 4 and an inner filter cap 5. The caps 4 and 5 are shown joined at the top as by spinning as at 6. An assembled filter unit consisting of the filter with the two top shells is permitted free movement at the top, on the handle 1. A pin 7 passing through the handle 1 supports a washer and a spring 8, and another washer and a felt for making the cap seal dust tight. The spring thrust is upward against the filter cap, holding the filter taut and cylindrical. The filter is held at the bottom. The filter top may now be pressed downward and swing from side to side through a moderate angle. When the operator picks up the cleaner (as shown in Figure 6) by gripping the fabric filter to internal handle the top cap moves downward slightly but freely; for if it did not and the filter sleeve were normally taut, the filter would be torn loose either top or bottom. Hence a yieldable filter top is essential where a soft filter sleeve is exposed (uncovered) and where it surrounds a central handle.

An approved form of my invention includes means of opening the top for cleaning or emergency purposes (see Figures 2, 3, and 4). In this form the fabric filter sleeve 2 is not clamped between the caps 4 and 5 but is instead joined to a filter ring 10. Fabric is riveted to the ring by means of rivets 11 passing through the holes 12. It is then drawn tight with a wire 15 (Figure 5) and turned inside-out so that the rivets do not appear on the outside and the wire attachment serves as a permanent holder.

The inner top shell 5 is provided with suitable depressions 18 which are designed to engage depressed areas 20 in the filter ring 10. These depressed areas 20 may have on their upper sides a slope represented by any desirable multiple thread pitch so that with a turning or threading motion the combined caps 4 and 5 may be made to impinge their edges (as at 21) on opposite sides of the roll of fabric formed by the wire fastener 15. Thus a dust tight seal is obtained. A partial turn of the top caps with respect to the filter ring makes the top openable or closable. A knob 22 properly placed on the upper side of the depression 20 may be so disposed that when the depression 18 in the cap 5 passes completely under it it will serve as a lock for resisting the accidental opening of the top cap without interfering with its manual removal.

Having set forth my invention in an approved mechanical form, I wish it understood that there are many ways and means of accomplishing some of the purposes for which this invention is made, without departing from the spirit thereof.

I claim:

1. In a vacuum cleaner, a motor-blower-unit, a dirt-receptacle, a filter disposed above said receptacle, an air duct at the side of said receptacle leading from said unit to said filter, a handle passing through said filter and rigidly joined to said unit, a solid cap firmly joined to the top of said filter and slidably supported on said handle, and with all the above recited elements substantially annular and co-axial, with a spring supported on said handle and exerting an upward pressure on said cap.

2. In a vacuum cleaner, a motor-blower-unit, a dirt-receptacle, a filter disposed above said receptacle, an air duct at the side of said receptacle leading from said unit to said filter, a handle passing through said filter and rigidly joined to said unit, a solid cap firmly joined to the top of said filter and slidably supported on said handle, and with all the above recited elements substantially annular and co-axial, with a ring firmly joined to the top of said filter, said ring removably joined in an air-tight manner to said cap.

WARD LEATHERS.